United States Patent [19]
Carlos et al.

[11] 3,928,667
[45] Dec. 23, 1975

[54] AQUEOUS THERMOSET COATINGS UTILIZING TITANIUM CHELATE CURING AGENTS

[75] Inventors: Donald D. Carlos, Middletown; Darrell D. Hicks, Jeffersontown, both of Ky.

[73] Assignee: Celanese Coatings & Specialties Company, Jeffersontown, Ky.

[22] Filed: Nov. 22, 1974

[21] Appl. No.: 525,891

Related U.S. Application Data

[63] Continuation-in-part of Ser. No. 426,786, Dec. 20, 1973, abandoned.

[52] U.S. Cl. ...... 427/385; 204/159.16; 204/159.24; 204/181; 260/29.6 H; 260/29.6 TA; 260/29.6 MM; 260/29.6 ME; 260/89.5 R; 260/89.5 AW; 260/89.5 S; 427/388
[51] Int. Cl.² ...................... B05D 7/24; C08L 29/00
[58] Field of Search ................ 260/29.6 MM, 29.6 M, 260/29.6 H, 29.6 TA, 89.5 R, 89.5 AW, 260/89.5 S, 29.6 ME; 117/119.6, 161 UZ, 117/161 UT, 161 UC; 427/385

[56] References Cited
UNITED STATES PATENTS

| | | | |
|---|---|---|---|
| 3,203,918 | 8/1965 | Goldberg et al. | 260/29.6 TA |
| 3,272,785 | 9/1966 | Lewis et al. | 260/89.5 R X |
| 3,726,823 | 4/1973 | Morishima et al. | 260/29.6 M |

*Primary Examiner*—Lucille M. Phynes
*Attorney, Agent, or Firm*—Herbert P. Price; K. A. Genoni; T. J. Morgan

[57] ABSTRACT

Thermoset coating compositions are made from an aqueous solution or dispersion of a polymer of a hydroxyalkyl acrylate catalyzed with a titanium chelate. Films useful as protective and decorative coatings are obtained.

7 Claims, No Drawings

AQUEOUS THERMOSET COATINGS UTILIZING TITANIUM CHELATE CURING AGENTS

CROSS REFERENCE TO RELATED APPLICATIONS

This application is a continuation-in-part of the now abandoned application, Ser. No. 426,786, filed Dec. 20, 1973.

BACKGROUND OF THE INVENTION

The field to which this invention is directed is coating compositions, particularly thermoset coating compositions involving the use of titanium compounds as crosslinking catalysts.

The use of titanium compounds in coating compositions as resin modifiers and as crosslinking agents is well known. U.S. Pat. No. 2,549,940 describes the use of various titanium compounds to titanate films of polyvinyl acetate, polyvinyl alcohol, polyvinyl butyrate, etc. U.S. Pat. Nos. 2,938,812, 3,258,442 and 3,371,004 describe polyvinyl alcohol polymers which are crosslinked by various titanium compounds. In U.S. Pat. No. 3,151,101, aldehyde modified unsaturated carboxylic acid amide interpolymers are coreacted with titanium esters to form crosslinked thermoset coatings and films. In all of these prior art patents, the titanium compounds take part in the crosslinking reaction by forming bonds between reactive groups in the polymers and the titanium atoms. Each of the crosslinks involve a titanium atom. The titanium compounds are coreactants in the systems and are not catalysts for the reaction.

SUMMARY OF THE INVENTION

This invention pertains to thermoset coating compositions, particularly coating compositions which are reducible with water. In particular, this invention relates to coating compositions which are crosslinked by using titanium compounds as catalysts. More particularly, this invention pertains to hydroxyester polymers crosslinked by ester interchange or alcoholysis reactions using titanium compounds as catalysts. In another aspect this invention relates to a process for preparing thermoset coating compositions by forming a film of an aqueous solution of a hydroxyester polymer and a titanium compound and heating the film to crosslink it through ester interchange reactions.

By this invention thermosetting coating compositions are made from an aqueous solution or dispersion of a polymer of a hydroxyalkyl acrylate or methacrylate, wherein the hydroxyalkyl group contains 2 to 4 carbon atoms, and a titanium chelate curing agent. Such compositions when formed into a coating and heated, form thermoset coatings through ester interchange between the ester groups in the polymer. As distinguished from the prior art, crosslinking occurs through ester interchange reactions between monomer moieties in the polymers and is not limited to crosslinking reactions involving the titanium compound.

DESCRIPTION OF THE INVENTION

The polymers useful in the process of this invention are polymers of hydroxyalkyl acrylates or methacrylates wherein the hydroxyalkyl group contains 2 to 4 carbon atoms. Such polymers can be divided into two categories:

1. Polymers which are inherently water soluble or water dispersible;
2. Polymers which have sufficient acid content to be water soluble or water dispersible when salted with an inorganic or organic base.

Type (1) polymers, those polymers which are inherently water soluble or water dispersible, are low molecular weight homo or copolymers of hydroxyalkyl acrylates or methacrylates which contain 10 to 100 weight % based on the weight of the polymer of a hydroxyalkyl acrylate or methacrylate wherein the hydroxyalkyl group contains 2 to 4 carbon atoms. The other monomers can be any monomers copolymerizable with the hydroxyalkyl acrylate or methacrylate. Preferably at least a portion of these monomers are acrylate or methacrylate esters of monohydric alcohols which contain 1 to 5 carbon atoms. Most preferably the copolymers will contain 10 to 60 weight % based on the weight of the copolymer of hydroxyalkyl acrylate or methacrylate, wherein the hydroxyalkyl group contains 2 to 4 carbon atoms, and at least 1 mol of an acrylate or methacrylate ester of a 1 to 5 carbon monohydric alcohol for each mol of the hydroxyalkyl acrylate or methacrylate.

Type (2) polymers are those polymers which have sufficient acid content, i.e., an acid value of at least 20, to be water soluble or water dispersible when salted with an organic or inorganic base.

Such polymers can be prepared by polymerizing a hydroxyalkylacrylate or methacrylate, wherein the hydroxyalkyl group contains 2 to 4 carbon atoms, with a polymerizable acid and/or in the presence of a mercaptan chain transfer agent which also contains carboxylic acid groups. Type (2) polymers are polymers of 10 to 95% by weight hydroxyalkylacrylates or methacrylates, and at least 5% by weight of a polymerizable ethylenically unsaturated acid or an organic carboxylic acid containing mercaptan or mixture thereof. Other monomers which can be used are any monomers which are copolymerizable with the hydroxyalkyl acrylate or methacrylate and the polymerizable acid. Preferably, at least a portion of the other monomer is an alkyl ester of acrylic or methacrylic acid wherein the alkyl group is derived from a 1 to 5 carbon monohydric alcohol. Most preferably, type (2) polymers are copolymers of 10 to 60% by weight of hydroxyalkyl esters of acrylic or methacrylic acid wherein the alkyl group contains 2 to 4 carbon atoms, an acrylate or methacrylate ester of a 1 to 5 carbon monohydric alcohol wherein at least 1 mol of the acrylate or methacrylate ester is present for each mol of the hydroxyalkyl monomer and sufficient acid groups to obtain an acid value of at least 20.

The hydroxyalkyl monomers useful in this invention are hydroxyalkyl acrylates or methacrylates wherein the hydroxyalkyl group contains 2 to 4 carbon atoms. Example of such monomers include betahydroxyethyl acrylate or methacrylate, betahydroxypropyl acrylate or methacrylate, betahydroxybutyl acrylate or methacrylate, gamma hydroxypropyl acrylate, or methacrylate, delta hydroxybutyl acrylate or methacrylate and the like. The preferred monomer is hydroxyethyl acrylate or hydroxypropyl acrylate.

The alkyl acrylate or methacrylate ester of a one to five carbon monohydric alcohol useful in this invention is exemplified by methyl acrylate or methacrylate, ethyl acrylate or methacrylate, isopropyl acrylate or methacrylate, n-butyl acrylate or methacrylate, isobutyl acrylate or methacrylate, n-amyl acrylate or methacrylate, secondary amyl acrylate or methacrylate, and the like.

The preferred alkyl ester for use in this invention is methyl acrylate or ethyl acrylate.

Polymerizable ethylenically unsaturated carboxylic acids useful in this invention include acrylic acid, methacrylic acid, ethacrylic acid, crotonic acid, itaconic acid, maleic acid and fumaric acid as well as half esters of maleic or fumaric acid wherein the ester group contains one to 10 carbon atoms. Examples of such half esters are methyl acid maleate, methyl acid fumarate, ethyl acid maleate, isopropyl acid fumarate, butyl acid maleate, 2-ethylhexyl acid maleate, decyl acid fumarate, etc. The most preferred of these acids are acrylic and methacrylic acid. These polymerizable ethylenically unsaturated carboxylic acids are used in an amount sufficient to obtain a polymer having an acid value of at least 20, and preferably about 30 up to about 150. On a weight basis this amount of acid will be at least about 4% by weight based on the weight of polymer up to about 25% by weight.

As stated hereinbefore, acid containing copolymers can also be obtained by polymerizing the monomers in the presence of a carboxylic acid containing mercaptan which serves as a chain transfer agent and which becomes an integral part of the polymer. Examples of such mercaptans are mercaptoacetic acid, 3-mercaptopropionic acid, mercaptobutyric acid, thiomaleic acid, and 2-mercaptopropionic acid, i.e., compounds which contain at least one mercaptan (SH) group and one carboxylic acid group and a total of about 2 to about 10 carbon atoms. The amount of chain transfer agent that is used will depend upon the particular acid value and molecular weight desired in the final product. The desired acid value is that set forth above, i.e., at least 20 and preferably 30 to about 150. The amount of mercaptan will vary from about 5% by weight based on the total polymer to about 25% by weight.

In addition to these monomers, the copolymers of the instant invention can contain other ethylenically unsaturated monomers which are copolymerizable therewith. Examples of these monomers include styrene, vinyl toluene, vinyl acetate, vinyl propionate, vinyl butyrate, vinyl laurate, vinyl oleate, vinyl stearate, and the other vinyl esters of fatty acids having from 1 to 18 carbon atoms. Likewise, the various esters of polymerizable acids such as crotonic, itaconic, fumaric acid and maleic acids can be utilized.

Acrylonitrile, methacrylonitrile, acrylamide, methacrylamide, methylstryrene, allyl acetate, t-butylaminoethyl methacrylate, vinyl pyrrolidone, N,N-dimethylaminoethyl methacrylate, ethylene, propylene, vinyl chloride, vinyl fluoride, vinylidene fluoride, hexafluopropylene, chlorotrifluoroethylene, and tetrafluoroethylene can also be used as the monomers herein.

In addition, of course, other acrylate esters or methacrylate esters may be utilized in the instant invention, and they need not comply with the above requirements on the acrylate monomers. For example, hexylacrylate or methacrylate 2-ethylhexyl acrylate or methacrylate, i.e., alkyl acrylates or methacrylates wherein the alkyl group contains from 6 to 20 carbon atoms, may be utilized herein, but of course would not be counted in determining the amount of the low molecular weight alcohol acrylate ester.

Generally any of the varied methods of vinyl polymerization may be used in the instant invention. Preferably, however, the various polymerization initiators are utilized. Examples include organic peroxides, such as tertiary butyl hydroperoxide, ditertiary butyl hydroperoxide, cumene hydroperoxide, dicumyl peroxide, benzoyl peroxide, and the like. Equally suitable are organic peroxygen compounds, such as tertiary butyl peroxide acetate, tertiary butyl perbenzoate, ditertiary butyl diperthalate, and the like. Other initiators include azodi-isobutyronitrile (AIBN), ultra-violet light, gamma radiation, etc.

In order to prepare the first class of copolymers which are utilizable herein, i.e., those polymers which are inherently water soluble or water dispersible, it is highly desirable to prepare extremely low molecular weight copolymers — copolymers having weight average molecular weights of less than about 10,000 and preferably less than 5,000. These copolymers are generally prepared by utilizing up to about 20% of a chain terminator. Examples of such chain terminators include aliphatic or aromatic mercaptans, having from 1 to 12 carbon atoms, and 1 to 4-SH groups per molecule. Examples of these chain terminators include, preferably, 2-mercaptoethanol, mercaptoacetic acid, 3-mercaptopropionic acid, 2-mercaptopropionic acid, octyl mercaptan, lauryl mercaptan, and the like.

In addition, low molecular weight polymers may be prepared by utilizing super atmospheric pressure polymerization, low dilution and high initiator techniques.

The polymers of the instant invention generally may be prepared by adding the above-described monomers to the reaction medium over a period ranging from 30 minutes to 10 to 12 hours. The polymerization initiator may be added to the reaction flask or may be mixed with the monomer, or separately added, depending upon the desired final product. Reaction temperatures may vary from 70° to 80°C. up to about 180° to 220°C. or higher, again depending upon the various desired end products and the monomers utilized.

The polymers of the instant invention may be prepared in bulk or in virtually any solvent and then a substantial portion of the solvent may be removed by vacuum or heat distillation. In addition, the polymers of the instant invention may be prepared in a water soluble solvent, e.g., ethanol, isopropanol, ethylene glycol monomethyl ether, and ethylene glycol monobutyl ether, and the polymers left in the solvent solution before solubilization. Finally, minor amounts of petroleum-based solvents, such as mineral spirits, naphthas, and the like, may be utilized, although it is desirable to remove as much of this solvent as possible before solubilization.

After the copolymer of the instant invention has been prepared as above, it is solubilized. If the polymer is inherently water soluble, then it may simply be added to water, preferably at slightly elevated temperature, to increase the liquidity of the polymer.

In instances where solubilization is effected by forming the base salt of the polymer, the number of base equivalents required for solubilization will depend upon a number of factors, including the molecular weight of the final polymer, the solubility of the monomers utilized to form the polymer, and the acid value of the final polymer. Normally, however, where water soluble systems are utilized, base equivalents in the range of about 0.3 to 1.0 per carboxylic acid equivalent are preferred.

Solubilization may be carried out by many various methods well known in the art. For example, the base may be added directly to the prepared polymer, and the thus formed salt then added to water, or the polymer in its liquid form may be added to an aqueous solution of the base to be used.

Although the inorganic bases such as the metallic hydroxides which are exemplified by potassium and sodium hydroxide, can be used, especially preferred as the organic base are ammonia or water soluble amines, such as, for example, the mono-, di-, and tri-lower alkyl amines such as methylamine, ethylamine, propylamine, butylamine, dimethylamine, diethylamine, dipropylamine, dibutylamine, and n-methyl-butylamine, triethylamine, tributylamine, methyldiethylamine, dimethylbutylamine, dimethylethanol amine, and the like; cyclic amines, such as morpholine, piperidine, diamines such as 2,3-toluene diamine, ethyl diamine and piperazine, and substituted amines such as, ethanolamine, diethanolamine, hexanolamine and methyldiethanolamine, octanolamine, and other polyglycol amines, triethanolamine, and methylethanolamine, n-aminoethanolamine, and methyldiethanolamine, and polyamines such as diethylene triamine, triethylene tetramine, and the like.

In order to assure stability and water solubility or water dispersibility in some copolymer systems it may be desirable to utilize a cosolvent. These cosolvents are generally relatively low molecular weight alcohols, esters, glycols, glycol ethers, glycol esters, mixed glycol ether-esters, and the like. Examples of the alcohols include butanol, ethanol, 2-ethyl hexanol, propanol, and the like. The glycols include ethylene glycol and propylene glycol. The glycol ethers include such compounds as ethylene glycol monoethyl ether and ethylene glycol monobutyl ether. The esters include ethyl acetate, butyl acetate and the like. The mixed ether-esters include ethylene glycol monoethyl ether acetate, etc. Generally, the cosolvents should comprise not more than about 30% of the total solvent or dispersant system, with the remainder being water.

The final significant components of the instant invention is a titanium chelate catalyst which is mixed with the above polymer or polymer salt at levels of from about 0.5 to 10% by weight based upon the total polymer weight, preferably about 2 to 8%.

These chelates may be represented by the general formula:

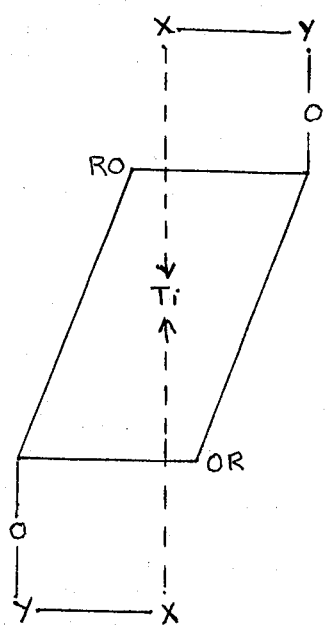

wherein X represents the electron donating atom (oxygen or nitrogen) and Y represents either a 2 or 3-carbon atom chain so that an unstrained five- or six-membered ring may be formed by the chelate. R may be alkyl, hydrogen or may be identical with the ligand represented by Y—OH.

Titanium chelates may be formed in either aqueous or nonaqueous systems. The aqueous formed titanates include titanium oxalate, titanium glycolate, and glycerol titanate. See U.S. Pat. Nos. 2,453,520 and 2,468,916 for these preparations.

Other titanium chelates may be prepared by reacting a tetraalkyl titanate, such as tetraisopropyltitanate, with the desired ligand.

Useful chelates are obtained by reacting the tetraalkyl titanate with
1. 1,2- or 1,3-glycols;
2. hydroxy acids wherein the hydroxy group is attached to the carbon alpha or beta to the carbonyl carbon, e.g., lactic acid, citric acid, tartaric acid, and glycolic acid;
3. di- and tri-alkanol amines wherein the OH group is on the beta carbon, e.g., the di- and tri-ethanol amine and di- and tri-isopropylamine; and
4. dibasic acids, such as oxalic acid.

In the case of the hydroxy acids and the dibasic acids, in order to assure that the titanate itself will be compatible with the water soluble or water dispersible systems, the titanate must be rendered itself water soluble by forming an organic base salt with the above-described organic or inorganic bases.

The most preferred titanates are triethanolamine titanate, titanium glycolate, and the ammonium salt of titanium lactate.

In order to prepare coatings from the products of the instant invention, the polymeric material is blended with the catalyst described above in combination with various pigments, fillers, and other materials normally used in aqueous coatings systems. The coating compositions generally will have a solids content of about 25 to about 80% by weight, at least half of the solvent being water. The material is then applied by spraying, brushing, dipping, etc. to the desired substrate, and baked at temperatures ranging from about 250° to 500°F. for from thirty seconds to 30 minutes, in order to produce a finished coating. In addition, the systems described in the instant invention may be applied by electrodeposition to an electrically charged anode with the organic or inorganic base being removed at the anode.

In the following examples all parts and percentages are by weight unless otherwise indicated.

EXAMPLE 1

Into a reaction flask equipped with a mechanical agitator, thermometer, reflux condenser and addition funnel were added 46.0 parts of beta-hydroxypropyl acrylate and 46.0 parts of methyl acrylate. The contents of the flask were heated to about 86°C. and the addition of mercapto propionic acid was begun. Twenty minutes later at a temperature of 92°C., a dual feed of 322.0 parts of hydroxypropyl acrylate, and 322.0 parts of methyl acrylate and 2.0 parts of ditertiary butyl peroxide in one feed, and 56.0 parts of mercapto propionic acid from the other feed was begun.

Over the prior 20 minutes, 8 parts of mercapto proionic acid had been added. The contents of the addition funnels were added to the reaction flask at temperatures ranging from 92° to 98°C. over about 3 hours. The reaction was continued for about 3 hours. A product resulted having a solids content of 97.5%. The contents of the flask were heated at about 130°C. for 4 hours and a downward condenser and aspirator vacuum was applied. The contents of the flask were then heated over about an hour to 150°C. A product resulted having an acid value of 41.1.

19.0 parts of the above mixture were blended with 1.25 parts of triethanolamine, 13.3 parts of water, and 1.25 parts of Tyzor TE, a triethanolamine titanium chelate at 80% solids in isopropanol, available from the DuPont Company. The clear blend exhibited a Gardner-Holdt viscosity at 25°C. of U-V. A 1½ mil drawdown of the above blend baked at 350°F. for 30 minutes on a steel panel produced a cured film having good appearance, a pencil hardness of H—2H and which passed 120 in/lb reverse impact. No effect from one hour in boiling water was observed on the film.

Examples of the aqueous solution of the above polymer blended with Tyzor TE remained stable after 6 months' standing at room temperature.

EXAMPLE 2

Utilizing the same procedure as in the preceding example, a polymer was prepared comprising 441 parts of hydroxypropyl acrylate, 189 parts of methyl acrylate. 70 parts of 2-mercapto ethanol and 1.75 parts of ditertiary butyl peroxide were used as catalysts-initiators. The polymer exhibited a solids content of 96.7% prior to stripping, and a viscosity of S, after stripping, at 80% concentration in water. 20.0 parts of the above material were blended with 1.25 parts of Tyzor TE and 5.0 parts of water. This blend was drawn down on a Bonderite 1000 cold rolled steel panel and with a 1½ mil drawdown blade and baked at 350°F. for thirty minutes. There resulted a film having excellent gloss, mar resistance and adhesion. The film passed a 60 in/lb reverse impact test, exhibited a pencil hardness of H—2H and was unaffected after immersing for 1 hour in boiling water.

EXAMPLE 3

To a suitable reactor equipped with a mechanical agitator, thermometer, reflux condenser and two addition funnels were added 46 parts of methyl acrylate and 46 parts of beta-hydroxypropyl acrylate. Stirring was begun and heat was applied. At 80°C., slow addition of 8 parts of mercaptopropionic acid was begun and added over a period of 6 minutes with the temperature rising to 96°C. 322 parts of methyl acrylate, 322 parts of beta-hydroxypropyl acrylate and 2 parts of di-t-butyl peroxide was added to one addition funnel. 56 parts of mercaptopropionic acid were added to the other funnel. Slow addition of the funnel components was begun and continued over a period of 2 hours and 48 minutes with the temperature rising slowly to 103°C. Heating was continued for 3 hours and 20 minutes with the temperature rising to 138°C. At the end of this heating period, the reactor was fitted with a downward condenser, vacuum was applied (35 mm. Hg. pressure) and the temperature was raised to 152°C. to remove unreacted monomers. The resulting resinous product, 795 parts, had a solids content of 98.7% and an acid value of 43.8.

To 17.92 parts of the copolymer were added and dissolved 2.08 parts of triethanol amine. 13.3 parts of deionized water were then slowly added with stirring until a clear solution was obtained. Then Tyzor TE, 1.25 parts at 80% solids in isopropanol, was added forming a clear solution.

EXAMPLE 4

Using the same procedure described in Example 3, 368 parts of styrene and 368 parts of hydroxypropyl acrylate were copolymerized using 64 parts 3-mercaptopropionic acid and 2 parts of di-t-butyl peroxide. The resulting product had a solids content of 97.6% and an acid value of 36.6.

To 18.22 parts of the copolymer were added 1.78 parts of triethanol amine followed by the addition of 46.7 parts of deionized water. After stirring and heating to 70°C., a clear solution was obtained. After cooling to room temperature, 1.25 parts of Tyzor TE were added.

Coatings were made on steel panels using the solutions of Examples 3 and 4. In order to obtain comparable film thicknesses, the solution from Example 3 was drawn down with a 1½ mil blade while a 3 mil blade was used for the Example 4 solution. The panels were baked at 350°F. for 30 minutes. Each coating had a similar appearance, both being hard and mar resistant. Both were tack free while hot and were unaffected by 1 minute xylene spot test.

Another set of panels were baked at 300°F. for 30 minutes. Again the cures were comparable.

Another set of panels were baked at 350°F. for 5 minutes. The coating obtained from Example 3 appeared to be somewhat better cured having less hot tack and better xylene resistance.

EXAMPLE 5

A styrene-allyl alcohol copolymer having an acid value of 0.5, a molecular weight of about 1600 and a hydroxyl equivalent weight of 300 was dissolved in ethylene glycol monoethyl ether acetate at 60% solids. To 33.3 parts of this solution were added 1.25 parts of Tyzor TE at 80% solids in isopropanol and 11.2 additional parts of ethylene glycol monoethyl ether acetate.

Films were drawn down on steel panels with a 2 mil drawn down blade using the sytrene-allyl alcohol solutions containing the titanium chelate and also a comparable styrene-allyl alcohol copolymer solution which contains no titanium catalyst. The films were baked at 350°F. for 30 minutes. Both films appeared identical in hardness and mar resistance. Both exhibited poor solvent resistance, the films dissolving in the xylene within the 1 minute test period.

As stated hereinbefore, the titanium catalysts used in this invention catalyze an ester interchange between the ester moieties in the copolymer vehicle coating. Example 3 demonstrates a preferred system in this invention, the copolymer being that of methyl acrylate and hydroxypropyl acrylate. Through catalysis of the titanium chelate and heat, ester interchange or alcoholysis takes place between the methyl groups of the methyl acrylate and the hydroxyl groups of the hydroxypropyl acrylate. Methanol is released and a cross-linking ester group is formed.

In addition to alcoholysis reaction between the monohydric alcohol esters and hydroxyl groups, reaction can also take place between the hydroxypropyl ester groups. In this reaction propylene glycol is split out between 2 hydroxypropyl groups. Example 4 describes the use of a copolymer of hydroxypropyl acrylate which contains no other ester groups. When baked at 300°F. and at 350°F. for 30 minutes, the cure was comparable to that obtained with the Example 3 copolymer. When Example 4 was baked at 350°F. for only 5 minutes, its cure was somewhat inferior to an Example 3 cure for the same time and temperature. Since propylene glycol is the by-product of the reaction of Example 4 and it is higher boiling than methyl alcohol, the by-product of Example 3, it would be expected that higher temperatures and/or longer times would be required to obtain comparable cures.

Example 5 demonstrates the use of a copolymer which contains no ester groups. No detectable cure was noted when films of this copolymer were heated with a titanium catalyst.

It is understood that the foregoing detailed description is given merely by way of illustration and that many variations can be made therein without departing from the spirit of this invention.

What is claimed is:

1. A thermosetting coating composition comprising
  A. a water soluble or water dispersible polymer of a hydroxyalkyl acrylate or methacrylate wherein the hydroxyalkyl group contains 2 to 4 carbon atoms and wherein the polymer is
    1. an inherently water soluble polymer which has a weight average molecular weight of less than 10,000 and which contains 10 to 100% by weight of the hydroxyalkyl acrylate or methacrylate and 90 to 0% by weight of a monomer copolymerizable therewith, said weight percentages being based on the total weight of polymer, or
    2. a polymer which has sufficient acid content to be water soluble or water dispersible when salted with an inorganic or organic base, said polymer having an acid value of at least 20 and which contains 10 to 95% by weight of the hydroxyalkyl acrylate or methacrylate, 5 to 25% by weight of a polymerizable ethylenically unsaturated acid or a carboxylic acid containing mercaptan or mixture thereof and 0 to 85% by weight of a monomer copolymerizable therewith, said weight percentages being based on the total weight of polymer;
  B. 0.5 to 10% by weight, based on the weight of polymer, of a titanium chelate catalyst; and
  C. an aqueous solvent or aqueous dispersant wherein said coatings composition has a total solids content of 25 to 80% by weight.

2. The composition of claim 1 wherein the other monomer copolymerizable therewith is an alkyl acrylate or methacrylate wherein the alkyl group is derived from a monohydric alcohol which contains 1 to 5 carbon atoms.

3. The composition of claim 2 wherein the polymer contains 10 to 60% by weight hydroxyalkyl acrylate or methacrylate, and at least one mol of the alkyl acrylate or methacrylate per mol of hydroxyalkyl acrylate or methacrylate.

4. The composition of claim 3 wherein the hydroxyalkyl acrylate is hydroxyethyl acrylate or hydroxypropyl acrylate and wherein the alkyl acrylate is methyl acrylate or ethyl acrylate.

5. The composition of claim 1 wherein the titanium chelate is triethanol amine titanate.

6. The composition of claim 1 wherein the weight average molecular weight of the inherently water soluble polymer is less than 5,000.

7. A process for forming a thermoset coating on a substrate which comprises
  A. applying to a substrate the coating composition of claim 1; and
  B. heating the coating at a temperature of at least 250°F. for a time sufficient to dry the coating and to crosslink it by ester interchange between the ester groups in the polymer.

* * * * *